United States Patent
Nakazono et al.

(10) Patent No.: US 11,566,595 B2
(45) Date of Patent: Jan. 31, 2023

(54) FRANCIS-TYPE TURBINE RUNNER AND FRANCIS-TYPE TURBINE

(71) Applicants: KABUSHIKI KAISHA TOSHIBA, Tokyo (JP); TOSHIBA ENERGY SYSTEMS & SOLUTIONS CORPORATION, Kawasaki (JP)

(72) Inventors: Masahiko Nakazono, Kawasaki Kanagawa (JP); Takero Mukai, Yokohama Kanagawa (JP)

(73) Assignees: KABUSHIKI KAISHA TOSHIBA, Tokyo (JP); TOSHIBA ENERGY SYSTEMS & SOLUTIONS CORPORATION, Kawasaki (JP)

( * ) Notice: Subject to any disclaimer, the term of this patent is extended or adjusted under 35 U.S.C. 154(b) by 0 days.

(21) Appl. No.: 17/122,046

(22) Filed: Dec. 15, 2020

(65) Prior Publication Data

US 2021/0207569 A1    Jul. 8, 2021

(30) Foreign Application Priority Data

Jan. 6, 2020 (JP) .............................. JP2020-000507

(51) Int. Cl.
*F03B 3/18*    (2006.01)
*F03B 3/02*    (2006.01)

(52) U.S. Cl.
CPC .................. *F03B 3/18* (2013.01); *F03B 3/02* (2013.01); *F05B 2220/32* (2013.01); *F05B 2240/12* (2013.01); *F05B 2240/303* (2020.08)

(58) Field of Classification Search
CPC ....... F03D 3/02; F03D 3/126; F05B 2240/303
See application file for complete search history.

(56) References Cited

U.S. PATENT DOCUMENTS

| | | | | |
|---|---|---|---|---|
| 3,174,720 A | * | 3/1965 | Sproule | F03B 11/006 415/110 |
| 3,436,055 A | * | 4/1969 | Lindquist | F03B 3/183 251/305 |
| 3,635,582 A | * | 1/1972 | Sproule | F04D 29/167 415/174.5 |
| 3,764,231 A | * | 10/1973 | Hachiya | F03B 3/12 416/186 R |
| 4,420,672 A | * | 12/1983 | Nolt, Jr. | B23K 25/00 219/126 |

(Continued)

FOREIGN PATENT DOCUMENTS

| | | |
|---|---|---|
| JP | 2005-146934 A | 6/2005 |
| JP | 2006-153011 A | 6/2006 |

*Primary Examiner* — J. Todd Newton
*Assistant Examiner* — Brian O Peters
(74) *Attorney, Agent, or Firm* — Foley & Lardner LLP

(57) ABSTRACT

According to an embodiment, the vane 13 has a thick root portion 16P formed on the band 12 side of a pressure surface to be joined to the band 12, with a thickness of the thick root portion 16P being gradually increased toward the band 12, and a thick root portion 16N formed on the band 12 side of a negative pressure surface to be joined to the band 12, with a thickness of the thick root portion 16N being gradually increased toward the band 12. The outlet end 15 has a first curved portion 151 and a second curved portion 152. An extreme point 15B forming a bottom end of the second curved portion 152 is positioned closer to the band 12 than an end of the thick root portion 16P, 16N on the crown 11 side.

8 Claims, 4 Drawing Sheets

(56) References Cited

U.S. PATENT DOCUMENTS 5,653,577 A * 8/1997 Wuhrer ................ F03B 11/006
  415/1
2006/0115357 A1 6/2006 Coulson et al.

* cited by examiner

FRANCIS-TYPE TURBINE RUNNER AND FRANCIS-TYPE TURBINE

CROSS REFERENCE TO RELATED APPLICATIONS

This application is based upon and claims the benefit of priorities from the prior Japanese Patent Application No. 2020-507, filed on Jan. 6, 2020; the entire contents of which are incorporated herein by reference.

FIELD

Embodiments described herein relate to a Francis-type turbine runner and a Francis-type turbine.

BACKGROUND ART

FIG. 6 is a sectional view of a conventional Francis-type turbine runner 100 (herebelow runner 100), along an axial direction. The runner 100 shown in FIG. 6 has a disk-like-shaped crown 11 coupled to a turbine main spindle in order to transmit rotation of the runner 100 caused by a water flow to the turbine main spindle, and a disk-like-shaped band 12 disposed axially apart from the crown 11 and opposed to the crown 11, and a plurality of vanes 13 fixed between the crown 11 and the band 12. The plurality of vanes 13 are circularly arranged with a circumferential interval therebetween.

When the runner 100 is rotated, a water flow enters a space between the crown 11 and the band 12 from an inlet end 14 of the vane 13, which is located radially outside. Thereafter, the water flow applies pressure energy to a pressure surface of the vane 13, and then flows downstream from an outlet end 15 of the vane 13, which is located radially inside. At this time, since a load such as a bending moment is applied to the vane 13 by a load from the water flow, it is necessary for the vane 13 to have a predetermined thickness to be able to withstand the load.

On the other hand, in order to reduce a loss, it is desirable that the outlet end 15 has a thickness as small as possible. Thus, the vane 13 is conventionally formed such that its thickness gradually decreases toward the outlet end 15. When the vane 13 has such a form, the thickness of the outlet end 15 on the crown 11 side and the thickness thereof on the band 12 side are small. Thus, a joint portion between the the vane 13 and the crow 11 and a joint portion between the vane 13 and the band 12 may respectively have insufficient strengths. However, it goes without saying that the outlet end 15 must have appropriate strength on both end sides thereof.

It is generally known that, during a normal operation of a Francis-type turbine comprising the aforementioned runner 100, a load applied to the crown 11 side of the outlet end 15 is larger than a load applied to the band 12 side thereof. Heretofore, little attention has been paid to ensuring the strength of a joint portion between the outlet end 15 and the band 12. Thus, it cannot be said that there are a lot of known techniques related to the strength between the outlet end 15 and the band 12, but a structure in which a curved portion that is concave toward the upstream side is formed in a portion of the outlet end on the band side has been proposed so far.

The aforementioned structure in which a curved portion that is concave toward the upstream side is provided on a portion of the outlet end on the band side is effective during the normal operation. However, the present inventors have found that such a structure is not necessarily effective regarding the strength against sudden impact generated in the vicinity of the band side of the outlet end. In the above structure, since the end of the curved portion on the crown side is set at a position relatively far from the band, a thickness of a portion at which the stress is concentrated on the outlet end band side when a bending moment is generated is generally small. It is presumed that this makes it difficult to secure the sufficient strength against a sudden impact. Thus, the present inventors have conducted intensive studies to find a method for ensuring the sufficient strength in the portion between the outlet end and the band, and the portion of the outlet end on the band side.

The embodiments described herebelow provide a Francis-type turbine runner and a Francis-type turbine, which are capable of reducing risk of damage to a portion of an outlet end of a vane on a band side.

DETAILED DESCRIPTION

In one embodiment, a Francis-type turbine runner comprises a crown, a band, and a vane provided between the crown and the band. The vane has an inlet end and an outlet end, the vane also having a thick root portion formed on the band side of a pressure surface to be joined to the band, with a thickness of the thick root portion being gradually increased toward the band, and a thick root portion formed on the band side of a negative pressure surface to be joined to the band, with a thickness of the thick root portion being gradually increased toward the band. The outlet end has a first curved portion that is convexly curved in a direction from the inlet end toward the outlet end, and a second curved portion that connects the first curved portion and the band, and is concavely curved in a direction from the outlet end toward the inlet end. An extreme point forming a bottom end of the second curved portion is positioned closer to the band than an end of the thick root portion on the crown side.

Figure 6:
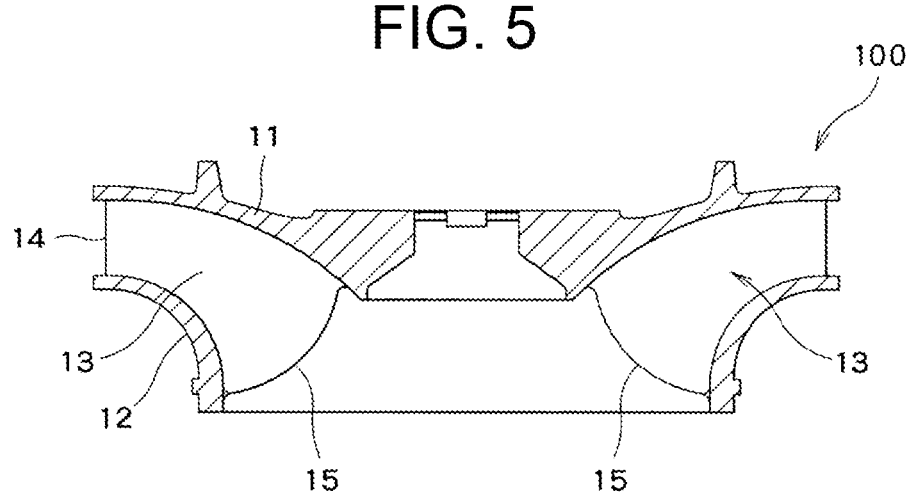
FIG. 6 is a sectional view of a conventional Francis-type turbine runner along an axial direction thereof.

In one embodiment, a Francis-type turbine comprises the aforementioned Francis-type turbine runner Herebelow, the respective embodiments are described in detail, with reference to the accompanying drawings. Constituent elements of the below embodiments, which are the same as those of the Francis-type turbine runner described with reference to FIG. 6, are designated by the same symbols.

First Embodiment

Figure 1:
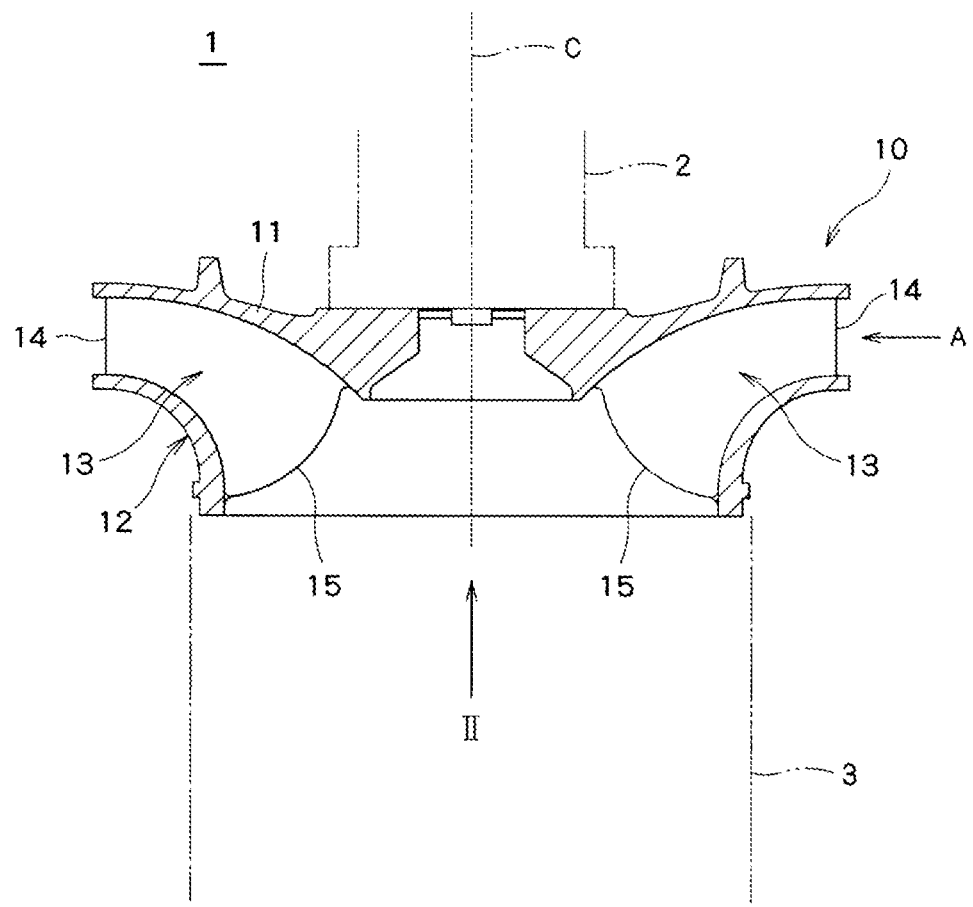
FIG. 1 is a schematic sectional view of a Francis turbine according to a first embodiment in a meridional plane thereof.

FIG. 1 is a schematic sectional view of a Francis turbine 1, according to a first embodiment, which is one embodiment of a Francis-type turbine, in a meridional plane thereof. The Francis-type turbine herein means a Francis turbine or a Francis-type pump turbine.

The Francis turbine 1 shown in FIG. 1 comprises a Francis-type turbine runner (herebelow runner 10) having a crown 11, a band 12, and a plurality of vanes 13 provided between the crown 11 and the band 12. In FIG. 1, a turbine main spindle 2 and a suction pipe 3, which are constituent elements of the Francis turbine 1, are shown by two-dot chain lines.

A water flow from a not-shown casing enters the runner 10 along a direction of an arrow A, and the runner 10 is rotated about a center axis C by this water flow. In the description below, the mere term "axial (direction)/axially" means a direction extending on the center axis C of the runner 10 or a direction parallel to the center axis C. The mere term "radial (direction)/radially" means any direction orthogonal to the center axis C. The term "circumferential (direction)/circumferentially" means a direction along a rotation direction of the runner 10 about the center axis C.

The crown 11 is a disk-like-shaped member that is coupled to the turbine main spindle 2 in order to transmit the rotation of the runner 10 to the turbine main spindle 2. The band 12 is a disk-like-shaped member that is disposed axially apart from the crown 11 and opposed to the crown. To be precise, the band 12 can be said as a hollow disk-like-shaped member and/or a cylindrical shape tapering toward the suction pipe 3 (downstream side). A plurality of the vanes 13 are circularly arranged with a circumferential interval therebetween. Each vane 13 has an inlet end 14 that is located radially outside, and an outlet end 15 that is located radially inside.

Figure 2:
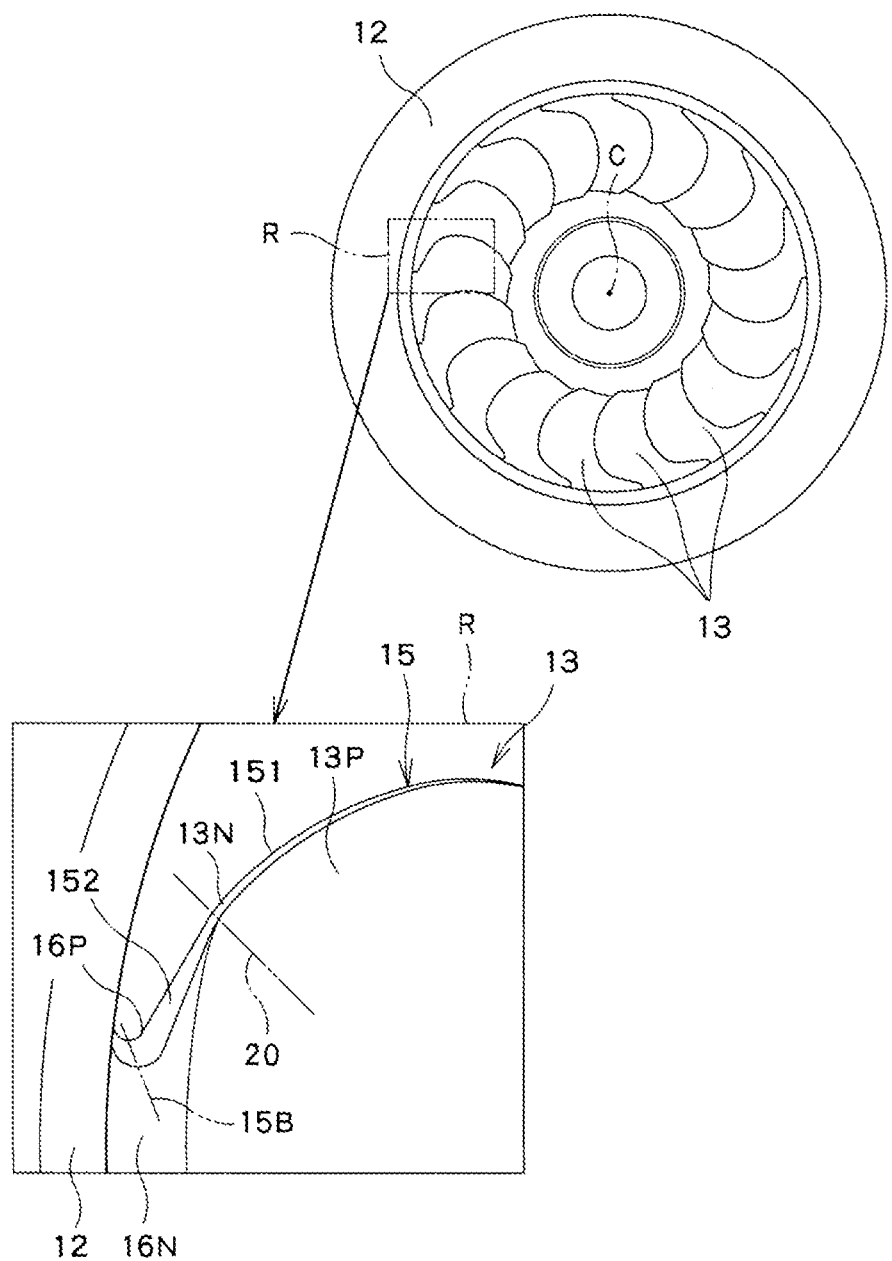
FIG. 2 is a view of a runner of the Francis turbine seen in a direction of an arrow II of FIG. 1.
Figure 3:
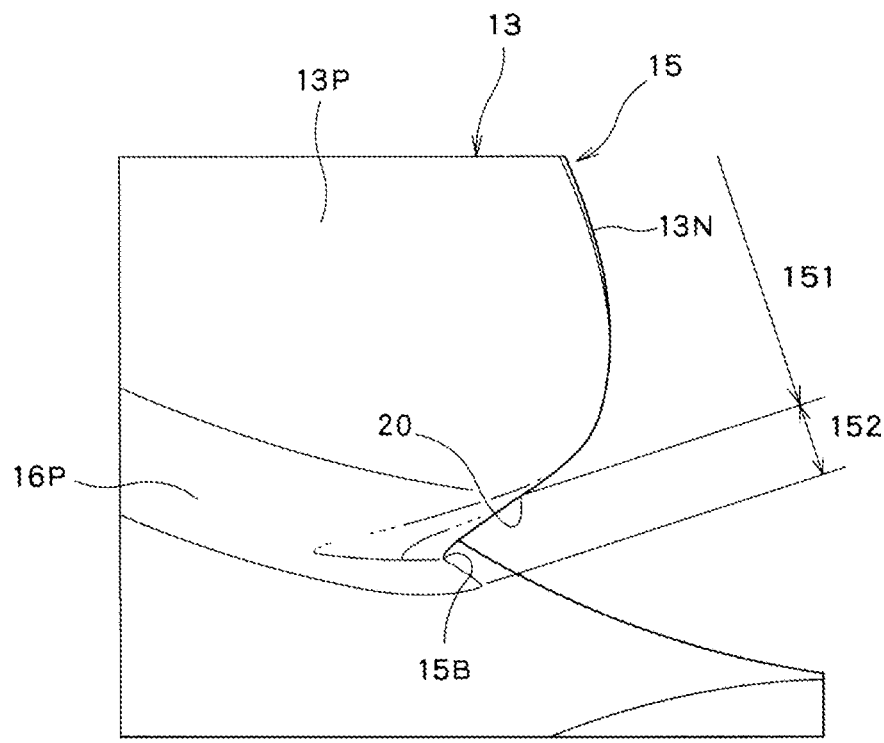
FIG. 3 is a perspective view of an outlet end of a vane and a band of the runner of the Francis turbine shown in FIG. 1.
Figure 4:
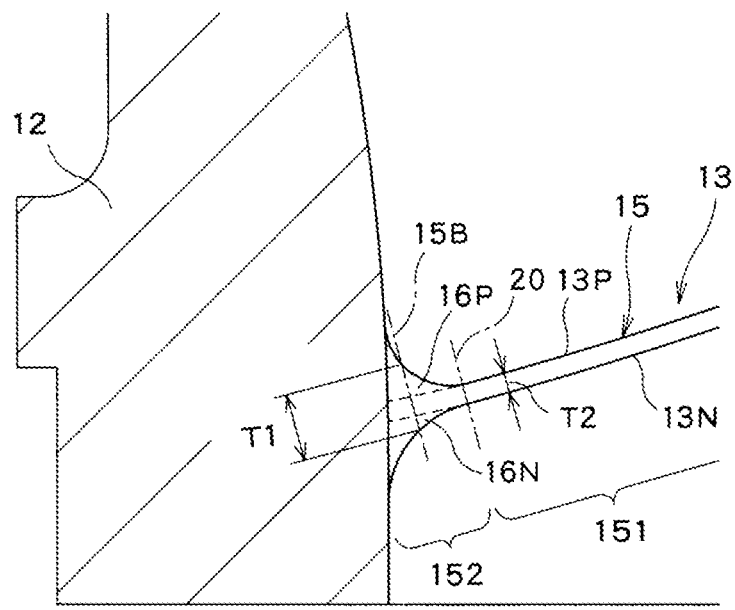
FIG. 4 is a view of the outlet end of the vane and the band of the Francis turbine runner shown in FIG. 1, seen from a position opposed to the outlet end of the vane.

FIG. 2 is a view of the runner 10 seen in a direction of an arrow II of FIG. 1. FIG. 2 also shows an enlarged view of an area R around the outlet end 15 of the vane on the band 12 side. FIG. 3 is a perspective view of the outlet end 15 of the vane 13 and the band 12. FIG. 4 is a view of the outlet end 15 of the vane 13 and the band 12, seen from a position opposed to the outlet end 15.

As shown in FIGS. 2 to 4, the outlet end 15 of the vane 13 in this embodiment has a first curved portion 151 that is convexly curved in a direction from the inlet end 14 toward the outlet end 15, and a second curved portion 152 that connects the first curved portion 151 and the band 12, and is concavely curved in a direction from the outlet end 15 toward the inlet end 14. In addition, the vane 13 has a thick root portion 16P formed on the band 12 side of a pressure surface 13P to be joined to the band 12, with a thickness of the thick root portion 16P being gradually increased toward the band 12, and a thick root portion 16N formed on the band 12 side of a negative pressure surface 13N to be joined to the band 12, with a thickness of the thick root portion 16N being gradually increased toward the band 12. Each thick root portion 16P, 16N is formed to extend from the inlet end 14 to the outlet end 15, such that its thickness gradually decreases toward the inlet end 14 and toward the outlet end 15.

A symbol 15B in FIGS. 2 to 4 depicts an extreme point forming a bottom end of the second curved portion 152. In this embodiment, the extreme point 15B is positioned closer to the band 12 than an end of the thick root portion 16P, 16N on the crown 11 side. The extreme point is a switch point between an inclination to a direction which comes close to the inlet end 14 as it extends toward a surface of the band 12 on the vane 13 side, and an inclination to a direction which comes close to the outlet end 15 as it extends toward a surface of the band 12 on the vane 13 side (in other words, a direction which is to be away from the inlet end 14 as it extends toward the surface of the band 12 on the vane 13 side). A symbol 20 depicts a curved-portion connecting inflection point which is set at a connection point between the first curved portion 151 and the second curved portion 152. Thus, the first curved portion 151 and the second curved portion 152 are connected via the curved-portion connecting inflection point 20. In this embodiment, the curved-portion connecting inflection point 20 is positioned at an end of the thick root portion 16P, 16N on the crown 11 side, or closer to the band 12 than the end on the crown 11 side (in this example, at the end on the crown 11 side). The extreme point 15B is positioned further closer to the band 12 than the curved-portion connecting inflection point 20.

As described above, the extreme point 15B and the curved-portion connecting inflection point 20 are located closer to the band 12. Thus, in this embodiment, as shown in FIG. 4, a thickness T1 of the vane 13 at the extreme point 15B of the second curved portion 152 is larger than a thickness T2 of the vane 13 at the end of the thick root portion 16P, 16N on the crown 11 side.

In more detail, the extreme point 15B of the second curved portion 152 is positioned closer to the band 12 than the end of the thick root portion 16P, 16N on the crown 11 side. The thickness T1 is a thickness between center parts of the surfaces of the thick root portions 16P and 16N. Thus, the thickness T1 is larger than the thickness T2 of the vane 13 at the end of the thick root portion 16P, 16N on the crown 11 side, or a part around it. It is preferable that the thickness T1 is three times or more the thickness T2. In detail, the vane 13 has a plate-like vane body portion provided between the crown 11 and the band 12, and the thick root portions 16P and 16N which are provided on the vane body portion on the band 12 side. In FIG. 4, a dashed line-portion depicts a portion of the vane body portion on the band 12 side, which is covered with the thick root portions 16P and 16N. The thickness T1 is a distance between two points at which a line, which passes through the extreme point 15B and is parallel to the thickness direction of the vane body portion, intersects the surfaces of the thick root portions 16P and 16N.

Next, an operation of the embodiment is described.

In the Francis turbine 1, a water flow enters a space between the crown 11 and the band 12 from the inlet end 14 of the vane 13 to apply pressure energy to the pressure surface of the vane 13, so that the runner 10 is rotated. During such a operation, the vane 13 is subjected to a load, such as a bending moment, which is caused by a load from the water flow. In addition, the vane 13 may be subjected to a bending moment caused by a sudden load.

In this embodiment, the extreme point 15B forming the bottom end of the second curved portion 152 is positioned closer to the band 12 side than the end of the thick root portion 16P, 16N on the crown 11 side. Thus, the thickness T1 of the vane 13 at the extreme point 15B of the second curved portion 152 is larger than the thickness T2 of the vane 13 at the end of the thick root portion 16P, 16N on the crown 11 side.

Thus, when the above bending moment is generated, stress may be concentrated on a part around the bottom end which is the extreme point 15B of the second curved portion 152. However, since the part around the bottom end can have a large thickness, it is easily possible to secure the strength that can withstand the stress concentration caused by the bending moment. Namely, in a conventional structure, the end of the curved portion, which corresponds to the second curve portion 152, on the crown side is set at a position relatively far from the band, and the position corresponding to the extreme point is also far from the band, so that it is generally impossible to secure the sufficient thickness of the portion on which the stress is concentrated. As compared with such a structure, the structure in this embodiment can easily secure the strength that can withstand the stress concentration caused when the bending moment is generated.

Thus, according to the runner 10 of this embodiment, the risk of damage to the portion of the outlet end 15 of the vane 13 on the band 12 side can be reduced.

Second Embodiment

Figure 5:
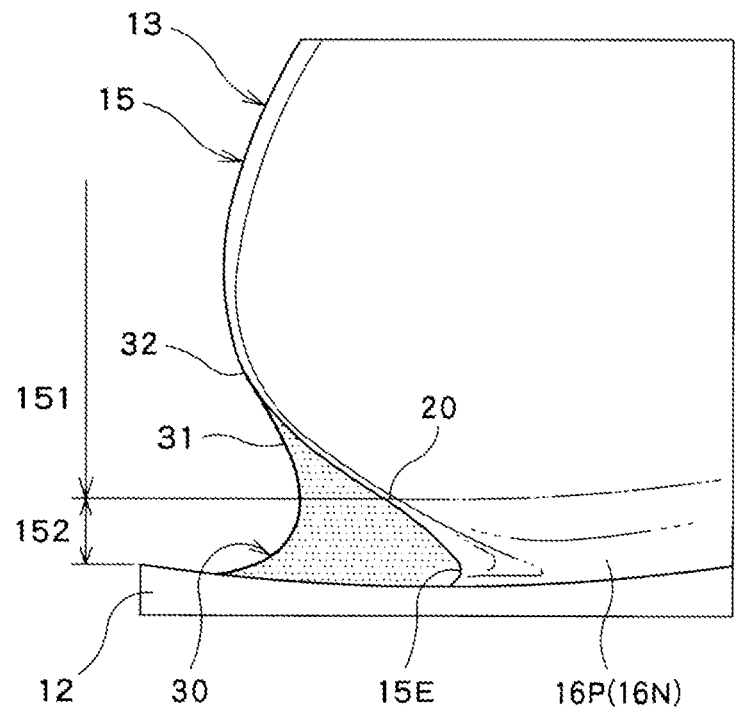
FIG. 5 is a view showing a part around an outlet end of a vane of a runner according to a second embodiment of a Francis turbine.

Next, a second embodiment is described with reference to FIG. 5. Constituent elements of the second embodiment, which are the same as those of the first embodiment, are designated by the same symbols, and description thereof is sometimes omitted.

A shape of the outlet end 15 of the vane 13 in this embodiment is the same as that of the first embodiment. On the other hand, as shown in FIG. 5, the vane 13 is provided with a vane forming member 30 that fills up an inside of the second curved portion 152 and a space between a portion of the first curved portion 151 facing the band 12 side and the band 12. The vane forming member 30 is formed separately from the vane 13, the band 12 and the crown 11, and thus is independent of them in terms of structural strength. The vane forming member 30 forms an outlet-end complementary portion 31 that smoothly continues to the first curved portion 151 to reach the band 12. A material forming such a vane forming member 30 is not particularly limited, but a curable filler containing a resin or the like may be used.

The outlet-end complementary portion 31 is concavely curved in a direction from the outlet end 15 toward the inlet end 14. In addition, the outlet-end complementary portion 31 is smoothly connected to the first curved portion 151 via an inflection point 32. The inflection point 32 is positioned closer to the crown 11 than the end of the thick root portion 16P, 16N on the crown 11 side, and is positioned closer to the crown 11 than the curved-portion connecting inflection point 20.

According to such a second embodiment, the risk of damage to a part around the outlet end 15 on the band 12 side can be reduced, while suppressing water flow turbulence.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the sprit of the inventions. The accompanying claims and their equivalents are intended to cover such forms or modifications as would fail within the scope and spirit of the invention.

In the above respective embodiments, although the Francis turbine has been described by way of example, the structures described in the above respective embodiments may be applied to a Francis-type pump turbine.

What is claimed is:

1. A Francis-type turbine runner comprising a crown, a band, and a vane provided between the crown and the band, wherein the vane has an inlet end and an outlet end, the vane also having a root portion formed at a part of a pressure surface of the vane on a side of the band to be joined to the band, with a thickness of the root portion being gradually increased toward the band, and a root portion formed at a part of a negative pressure surface of the vane on the side of the band to be joined to the band, with a thickness of the root portion being gradually increased toward the band, the outlet end has a first curved portion that is convexly curved in a direction from the inlet end toward the outlet end, and a second curved portion that connects the first curved portion and the band, and is concavely curved toward the inlet end, and an extreme point forming a bottom end of the second curved portion on a side of the inlet end of the vane is positioned closer to the band than an end of the root portion on a side of the crown, wherein a vane forming member, which fills up an inside of the second curved portion and a space between a portion of the first curved portion facing the band side and the band, is provided, and the vane forming member forms an outlet-end complementary portion that smoothly continues to the first curved portion to reach the band.

2. The Francis-type turbine runner according to claim 1, wherein the first curved portion and the second curved portion are connected via an inflection point, and the inflection point is positioned at the end of the root portion on a side of the crown, or closer to the band than the end on the side of the crown, while the extreme point is positioned closer to the band than the inflection point.

3. The Francis-type turbine runner according to claim 1, wherein the outlet-end complementary portion is concavely curved toward the inlet end.

4. The Francis-type turbine runner according to claim 3, wherein the outlet-end complementary portion is connected to the first curved portion via an inflection point.

5. The Francis-type turbine runner according to claim 4, wherein the inflection point between the outlet-end complementary portion and the first curved portion is positioned closer to the crown than the end of the root portion on the crown side.

6. The Francis-type turbine runner according to claim 1, wherein a thickness of the vane at the extreme point of the second curved portion is larger than a thickness of the vane at the end of the root portion on the crown side.

7. The Francis-type turbine runner according to claim 6, wherein the thickness of the vane at the extreme point of the second curved portion is three times or more the thickness of the vane at the end of the root portion on the crown side.

8. A Francis-type turbine comprising the Francis-type turbine runner according to claim 1.

* * * * *